(12) United States Patent
Keck et al.

(10) Patent No.: US 11,338,998 B1
(45) Date of Patent: May 24, 2022

(54) SYSTEMS AND METHODS FOR MULTIMODAL ASYNCHRONOUS TRANSPORTATION

(71) Applicant: Amazon Technologies, Inc., Seattle, WA (US)

(72) Inventors: Kevin Keck, Seattle, WA (US); Ganesh Krishnamoorthy, Seattle, WA (US); Vivek Narayanan, Sammamish, WA (US); Rajeev Dwivedi, Sammamish, WA (US); Mohit Malik, Seattle, WA (US); Shahid Azad, Seattle, WA (US)

(73) Assignee: AMAZON TECHNOLOGIES, INC., Seattle, WA (US)

(\*) Notice: Subject to any disclaimer, the term of this patent is extended or adjusted under 35 U.S.C. 154(b) by 121 days.

(21) Appl. No.: 16/834,809

(22) Filed: Mar. 30, 2020

(51) Int. Cl.
*B65G 1/06* (2006.01)
*B65G 1/04* (2006.01)
*G06Q 10/08* (2012.01)
*B65G 1/137* (2006.01)

(52) U.S. Cl.
CPC .......... *B65G 1/065* (2013.01); *B65G 1/0492* (2013.01); *B65G 1/1376* (2013.01); *B65G 1/1378* (2013.01); *G06Q 10/087* (2013.01)

(58) Field of Classification Search
CPC combination set(s) only.
See application file for complete search history.

(56) References Cited

U.S. PATENT DOCUMENTS

| | | | |
|---|---|---|---|
| 2014/0214195 A1* | 7/2014 | Worsley | B65G 1/1378 700/217 |
| 2016/0167888 A1* | 6/2016 | Messina | B65G 1/0492 198/315 |
| 2019/0241369 A1* | 8/2019 | Reeser | B65G 27/08 |

\* cited by examiner

*Primary Examiner* — Kyle O Logan
(74) *Attorney, Agent, or Firm* — Eversheds Sutherland (US) LLP (57) ABSTRACT

Systems, methods, and computer-readable media are disclosed for multimodal asynchronous transportation. In one embodiment, an example system may include a portable conveyor assembly configured to receive one or more items, the portable conveyor assembly including a conveyor belt, a drive motor, and a magnet. The portable conveyor assembly may be configured to couple to an item sortation system to receive sorted items, and to couple to a vehicle for transportation of the portable conveyor assembly from the item sortation system to a different system of a fulfillment center.

20 Claims, 7 Drawing Sheets

SYSTEMS AND METHODS FOR MULTIMODAL ASYNCHRONOUS TRANSPORTATION

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. However, such equipment may create chokepoints or cause bottlenecks in fulfillment center operations. Accordingly, improvements in various operations and components of order fulfillment, such as improvements to picking technology, sorting technology, packing technology, and so forth may be desired, such that manual efforts can be redirected to different tasks.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, may be difficult depending on a type of packaging in which the item comes with. Humans may be able to manually handle individual items with ease. However, robotic handling of individual items may require various levels of dexterity. Moreover, fulfillment centers may include lengthy conveyors that may be used to transport objects, such as packages, products, items, or other objects. Such conveyors or similar systems may create potential chokepoints or bottlenecks in operation of the fulfillment center. For example, a jam at a particular point in a conveyor system may cause one or more entire portions of the conveyor to be paused. Similarly, load balancing, such as instances where pick rates exceed sort rates or pack rates for items may cause some or all of a conveyor system to be paused while loads are balanced. Moreover, reconfiguration of a fulfillment center layout may be costly and difficult due to material handling equipment, such as conveyor systems, that may be difficult to move.

To solve such issues, embodiments of the disclosure may include multimodal asynchronous transportations systems that may be used to transport items from one station or system of a fulfillment center to another. For example, embodiments of the disclosure may include one or more portable conveyor assemblies on which items may be placed, and that can be transported from one system or station in a fulfillment center to another. In one example, the portable conveyor assemblies may be transported from an item picking station to an item packing station via one or more vehicles, which may include robots, autonomous vehicles, semi-autonomous vehicles, and the like. The vehicles may replace some or all conveyor systems in the fulfillment center. As a result, flexibility of the processing of items at the fulfillment center may be increased, as transportation of items can be asynchronous and/or non-linear, unlike synchronous and/or linear paths formed by conveyors. In some embodiments, certain stations in a fulfillment center may be bypassed. For example, an item for a single-item online order may be picked at a picking station and transported directly to a packing station instead of first passing through a sorting station. As a result, throughput of the fulfillment center may be increased and overall efficiency may be improved. Moreover, embodiments may include vehicles that may act as buffers between processes or systems of a fulfillment center to facilitate load balancing. For example, if item picking is progressing more rapidly than item sortation and/or item packing or another downstream process, rather than pause a conveyor system, embodiments of the disclosure may continue to retrieve picked items and retain the items on the respective vehicles until bandwidth is available for further processing.

Figure 1:
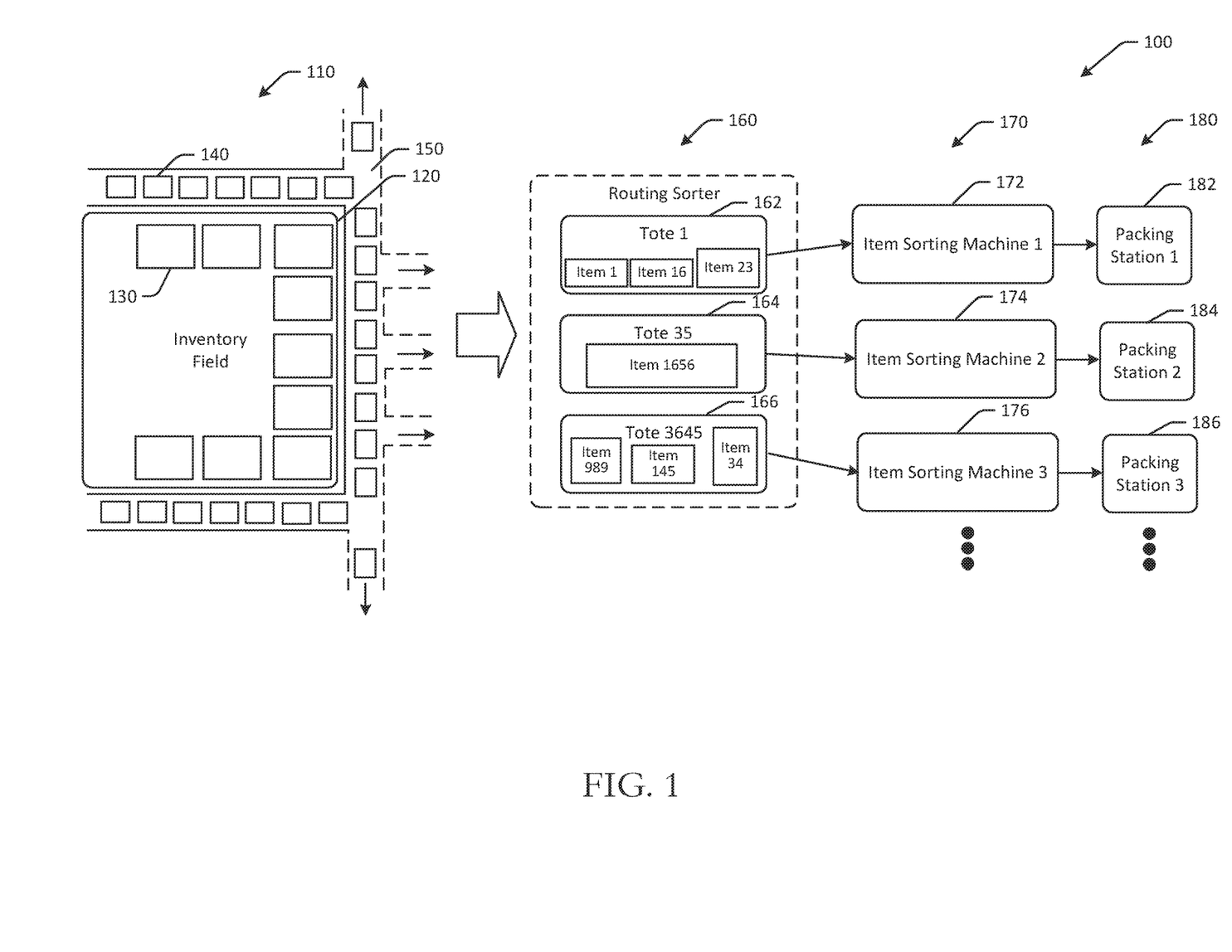
FIG. 1 is a hybrid schematic illustration of an example use case for multimodal asynchronous transportation in accordance with one or more embodiments of the disclosure.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, the mechanisms used to transport items, either individually or in groups, may be isolated in their unique silos and may not otherwise interact with each other. As a result, an additional step to connect any two such operations may be needed. For example, transporting items from a pick station to a sort station may require the item(s) to be picked into a container such as a tote which may then be handled manually or via an automated system to place it on a conveyor or similar transportation system that will carry the container to the sorting station. This increases the number of times an item is handled, and also increases a number of process steps, both of which can lead to increased defect rates. Additionally, different processes may run at different rates which may preclude the use of a common mechanism that can tie together all the different processes.

Embodiments of the disclosure include methods and systems for multimodal asynchronous transportation that may improve processing and fulfillment of orders. Certain embodiments include portable conveyor assemblies that can be used to transport one or more items through a fulfillment center, such as via vehicle (e.g., a guided vehicle, an autonomous robot/vehicle, etc.) or through equipment associated with a particular system, such as an item sortation system. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for multimodal asynchronous transportation is depicted in accordance with one or more embodiments of the disclosure. Although discussed in the context of online orders, other embodiments may be directed to any suitable use case where objects are picked and released, such as instances where objects are picked from inventory, placed into containers, removed from containers for sorting, packed into boxes, and so forth.

In FIG. 1, a fulfillment center may be a traditional fulfillment center and may include an inventory field 110, a routing sorter 160, one or more item sorting machines 170, and one or more packing stations 180. The inventory field 110 may be include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. For example, systems as described herein may be used to pick objects from conveyors, move the objects laterally, and place the retrieved objects into containers or onto other surfaces. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

In a traditional fulfillment center, such as that illustrated in FIG. 1, one or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In contrast, embodiments of the disclosure may not include some or all of the conveyors 150, and instead may include portable conveyor assemblies and/or vehicles.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of objects is used, such as to pick items from inventory, place items in totes, remove items from totes, place items into bins, remove items from bins, place items into boxes for shipping, transport items, and so forth, multimodal asynchronous transportation systems and methods as described herein may be used. As a result, manual effort can be redirected to other tasks.

Embodiments of the disclosure include systems and methods for multimodal asynchronous transportation. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
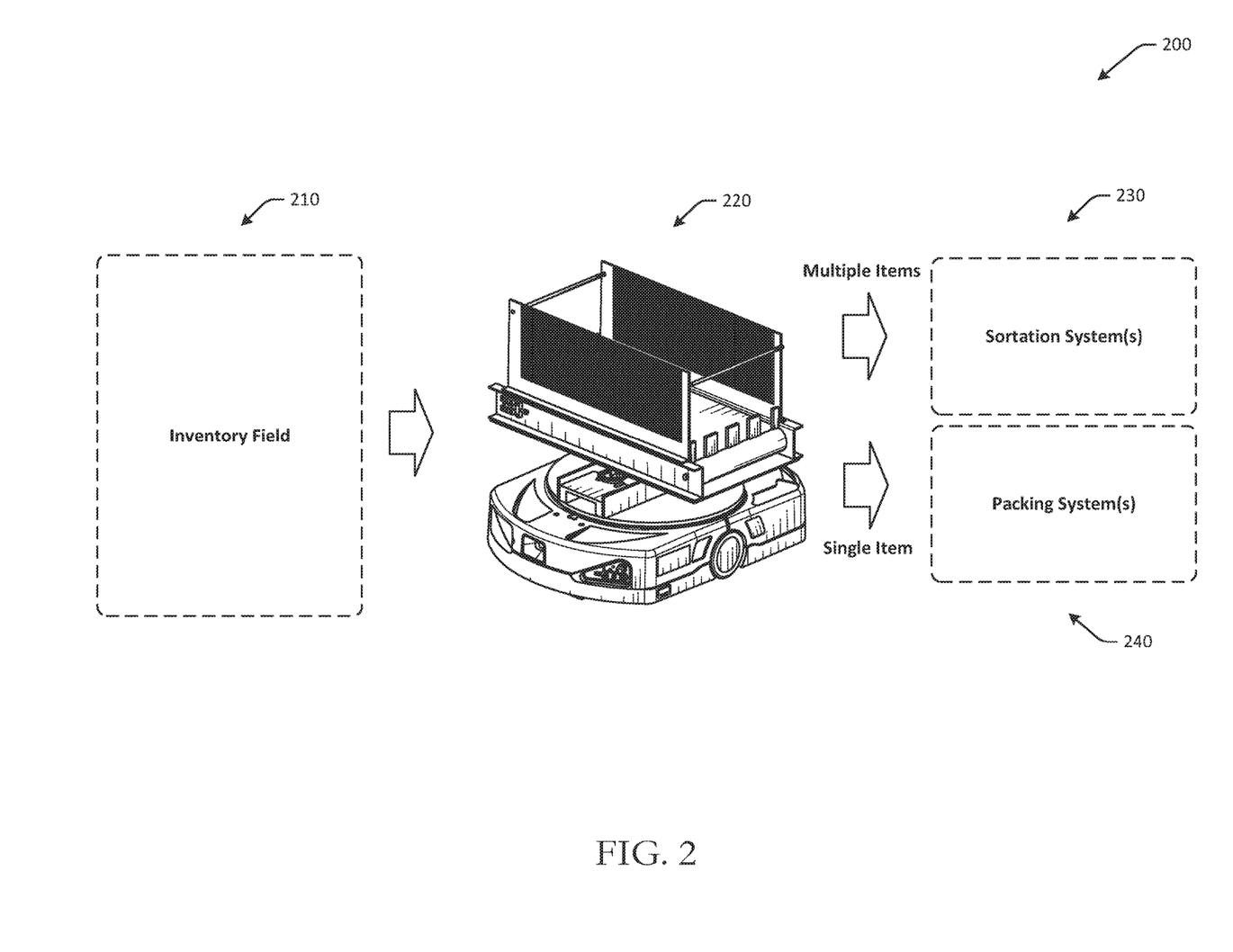
FIG. 2 is a schematic illustration of an example process flow for multimodal asynchronous transportation in accordance with one or more embodiments of the disclosure.

FIG. 2 is a schematic illustration of an example process flow 200 for multimodal asynchronous transportation in accordance with one or more embodiments of the disclosure. Other embodiments may include additional or fewer components. The illustration of FIG. 2 may not be to scale, and may not be illustrated to scale with respect to other figures.

In FIG. 2, a fulfillment center may include an inventory field 210, at which products or other items may be stored in inventory. As the items are ordered in online orders, the products may be picked from the inventory field 210 and routed for downstream processing in the fulfillment center. The items may be picked manually, using vehicles, or a combination thereof.

The picked products may be placed into one or more portable conveyor assemblies, such as a portable conveyor assembly 220. In FIG. 2, the portable conveyor assembly 220 is depicted coupled to a vehicle. For example, inventory may be picked from the inventory field 210, and placed into the portable conveyor assembly 220 for transportation to a downstream process. The portable conveyor assembly 220 may include a conveyor belt, a drive motor configured to move the conveyor belt in one or more directions, sidewalls to prevent the items from falling out of the portable conveyor assembly 220, and so forth. The portable conveyor assembly 220 is discussed in more detail with respect to FIGS. 4-6.

The portable conveyor assembly 220 may be transported from the inventory field 210 to one or more downstream processes, such as a sortation system 230, or a packing system 240. For example, the sortation system 230 may be a system at which items picked from the inventory field 210 may be sorted into respective totes or other containers for particular orders. For example, items for different orders may be placed into the portable conveyor assembly 220 from the inventory field 210. The items may be sent to the sortation system 230 for sorting into particular orders. In some embodiments, the portable conveyor assembly 220 may be inducted into the sortation system 230, whereas in other embodiments, items from the portable conveyor assembly 220 may be removed and inducted into the sortation system 230 for sortation.

The packing system 240 may be a station at which one or more items associated with an order may be packed into a box or other container for shipment. A shipping label may be applied and the package may be dispatched to a loading dock or elsewhere for shipment.

In some embodiments, such as that illustrated in FIG. 2, the portable conveyor assembly 220 may be transported from a first system or station of the fulfillment center to a second system or station of the fulfillment center using a vehicle. This may provide added flexibility for routing of the portable conveyor assembly 220, such as the ability to bypass a certain station. For example, as noted in FIG. 2, if the portable conveyor assembly 220 includes multiple items, the vehicle or an associated computer system may route the portable conveyor assembly 220 from the inventory field 210 to the sortation system 230. However, if the portable conveyor assembly 220 includes a single item, the vehicle or an associated computer system may route the portable conveyor assembly 220 from the inventory field 210 to the packing system 240. This may be because the single item is associated with a single-item order. Accordingly, the portable conveyor assembly 220 may bypass the sortation system 230 as sorting of the single item may not be necessary.

In some embodiments, the system may include, or may otherwise be in communication with, a computer system configured to manage one or more operations of the fulfillment center. For example, the computer system may determine that the portable conveyor assembly 220 has an item for a single-item online order, and may therefore cause the vehicle to retrieve the portable conveyor assembly from an item picking system and to deliver the portable conveyor assembly to an item packing system while bypassing the item sortation system.

Accordingly, embodiments of the disclosure may provide a seamless and automated transportation of items through individual upstream/downstream processes in a fulfillment center, such as picking, sortation, and so forth, and may also connect individual processes together.

In an example embodiment, a system may include a picking station at which items for online orders are removed from the inventory field 210. The items may be placed into the portable conveyor assembly 220. The system may include a sorting station or the sortation system 230 at which items are sorted into containers associated with respective online order identifiers. The system may include a packing station or the packing system 240 at which items for online orders are packed into boxes for shipment. The system may optionally include, or may otherwise be in communication with, a vehicle configured to move between the picking station, the sorting station, and the packing station. The vehicle may, in some embodiments, be in communication with a computer system, while in other embodiments, the vehicle may be configured to dynamically determine a path through the fulfillment center. To act as a buffer, the vehicle may be configured to pause during transport to form a buffer between the first system and the second system.

The vehicle may include a linear drive motor. In some embodiments, the vehicle may be configured to receive the portable conveyor assembly 220, whereas in other embodiments, the vehicle may include the portable conveyor assembly 220 or a different portable conveyor belt assembly that is configured to be loaded onto and unloaded off of the vehicle using the linear drive motor or other mechanism.

The portable conveyor assembly 220 may include a conveyor belt that may have a first set of one or more raised flaps and a second set of one or more raised flaps. The first set of raised flaps may form a first barrier along a first open-ended side of the portable conveyor assembly 220, and the second set of raised flaps may form a second barrier along a second open-ended side of the portable conveyor assembly 220 to prevent items rolling off of the conveyor belt. The portable conveyor assembly 220 may include an on-board drive motor configured to move the conveyor belt in a forward direction and/or a reverse direction. The portable conveyor assembly 220 may include a magnet disposed on a lower surface of the portable conveyor belt assembly 220. The magnet may be used to propel and/or secure the portable conveyor assembly 220. For example, the magnet may prevent the portable conveyor belt assembly 200 from moving while the vehicle is in motion and the linear drive motor is engaged. To onboard or offload the portable conveyor assembly 220, the linear drive motor of the vehicle or other component may be used in conjunction with the magnet to impart motion to the portable conveyor assembly 220.

In some embodiments, the portable conveyor assembly 220 may be configured to be coupled to the first system and the second system of the fulfillment center using one or more couplers, such as mechanical couplers, electronic coupler devices, electromagnetic coupler devices, and so forth. For example, the portable conveyor assembly 220 may be configured to move onto and off of an item sortation system or another system as a whole. In an example, the portable conveyor assembly 220 may be loaded onto an item sortation system via one or more elevators or ramps, as depicted in FIG. 3.

Figure 3:
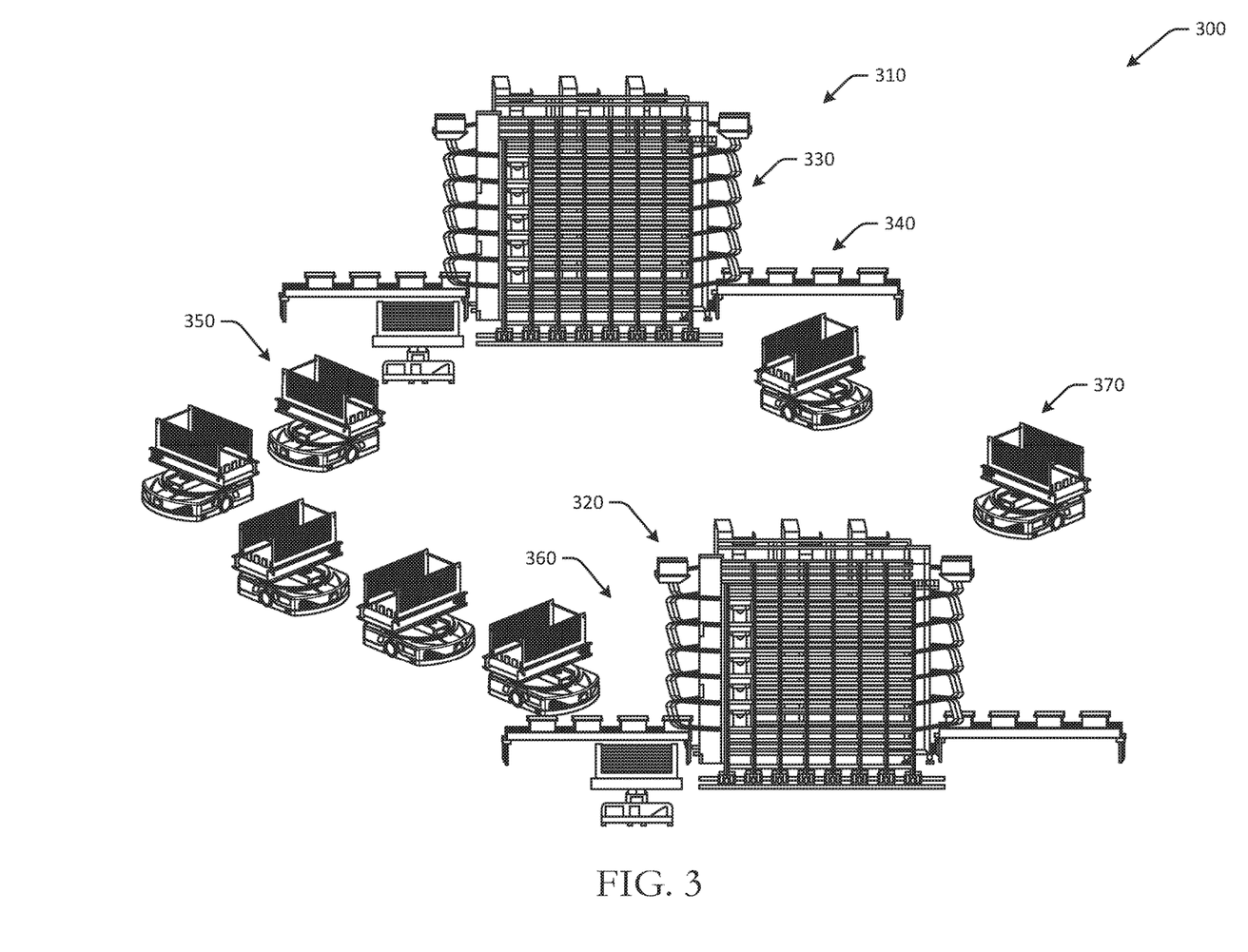
FIG. 3 is a schematic illustration of an example use case for a multimodal asynchronous transportation system in a fulfillment center in accordance with one or more embodiments of the disclosure.

FIG. 3 is a schematic illustration of an example use case for a multimodal asynchronous transportation system in a fulfillment center 300 in accordance with one or more embodiments of the disclosure. Other embodiments may include additional or fewer components. The illustration of FIG. 3 is not to scale, and may not be illustrated to scale with respect to other figures. The system illustrated in FIG. 3 may include the same multimodal asynchronous transportation system discussed with respect to FIGS. 1-2.

In FIG. 3, inventory may be delivered to the fulfillment center 300 via truck shipments. Inventory may be emptied into totes and transported to an inventory field for storage. Items may be picked from inventory and routed to different downstream processes in the fulfillment center 300.

For example, in the example of FIG. 3, a first process 310 may be an item sortation process at an item sortation system. The item sortation system may be configured to induct items, sort the items into bins, totes, or other containers. When items for an order are complete (e.g., all of the items in the order have been aggregated into a particular bin, etc.), the bin or tote may be removed from the item sortation system and transported downstream to a second process 320, such as to a packing process, a subsequent sortation process, and/or other process. Although the second process 320 is illustrated as a particular tiered structure in the example of FIG. 3, in other embodiments, the second process 320 may have different equipment or hardware than the first process 310.

In the first process 310, the item sortation system may include one or more elevators 330 and/or inbound and outbound conveyors 340 that may be used by one or more portable conveyor assemblies to access the item sortation system or other first process 310 equipment. For example, portable conveyor assemblies may enter the item sortation system via the conveyors 340 and/or through the elevators 330. In some embodiments, the conveyors 340 may not be included. Similarly, the equipment at the second process 320 may include one or more conveyors or elevators 360 that may be used by portable conveyor assemblies to enter and/or exit the second process 320.

One or more portable conveyor assemblies may be transported between the first process 310 and the second process 320 using one or more robots, which may or may not be autonomous. For example, a portable conveyor assembly 350 may have a payload of items, and may be transported from the first process 310 to the second process 320. The portable conveyor assembly 350 may then return 370 to the first process 310 after the item(s) are removed from the portable conveyor assembly 350.

The portable conveyor assembly 350 may be configured to receive one or more items as payload. The portable conveyor assembly 350 may include a conveyor belt, a drive motor, and a magnet. In some embodiments, the portable conveyor assembly 350 may include an on-board power source, such as a battery, capacitor, or other power source. The portable conveyor assembly 350 may be configured to couple to an item sortation system (such as that illustrated as the first process 310 in FIG. 3) to receive sorted items, and to couple to a vehicle for transportation of the portable conveyor assembly 350 from the item sortation system to a different system of a fulfillment center (such as that illustrated as the second process 320 in FIG. 3). The different system may be an item packing system, an item picking system, or another system.

In some embodiments, the system may include, or may otherwise be in communication with, a computer system configured to manage one or more operations of the fulfillment center. For example, the computer system may determine that the portable conveyor assembly 350 has an item for a single-item online order, and may therefore cause the vehicle to retrieve the portable conveyor assembly from an item picking system and to deliver the portable conveyor assembly to an item packing system while bypassing the item sortation system.

The portable conveyor belt assembly 350 may be configured to be inducted into various processes. For example, the portable conveyor belt assembly 350 may be inducted into the picking station, the sorting station, and/or the packing station of the fulfillment center. Induction may indicate that the portable conveyor belt assembly 350 itself is at least partially coupled to the respective equipment at the various stations, instead of items in the portable conveyor belt assembly 350 being inducted into a process or equipment. The portable conveyor belt assembly 350 may be configured to be transported from the picking station to the sorting station or the packing station via a vehicle or other mobile transportation robot.

In the embodiment illustrated in FIG. 3, the portable conveyor belt assembly 350 may act as a shuttle that carries one or more items as the transportation mechanism within some or all of the individual processes such as picking, sorting, packing, etc. Within these processes, a number of such portable conveyor belt assemblies can be used and can be propelled by various means, such as linear or rotary motors, pallet conveyors, rack and pinion systems, etc. In an example embodiment, the portable conveyor belt assembly 350 may be transported via linear synchronous motors. As a result, individual processes may be executed at a relatively higher speeds and in an asynchronous fashion within that process (e.g., different shuttles in a given process can be controlled individually and can move at different speeds, etc.). In some embodiments, the portable conveyor belt assembly 350 may be configured to move in some or all three dimensions (e.g., horizontal, lateral, vertical) within specific process stations.

The portable conveyor belt assembly 350 may be transported between processes using a robot or vehicle, such as an autonomous robot. The portable conveyor belt assembly 350 may be configured to drive off from a platform with guiderails onto the autonomous robot, which may have a linear synchronous motor segment mounted on an upper surface to receive the portable conveyor belt assembly 350 and/or position the portable conveyor belt assembly 350. The portable conveyor belt assembly 350 may be attached with a quick connect mechanism to hold it securely in place during transport from one process station to another. Once at the destination process station, the portable conveyor belt assembly 350 may disengage automatically and enter into the process station where the portable conveyor belt assembly 350 may reengage with a similar linear drive motor or other propulsion system associated with the process station.

Numerous vehicles can be queued and directed to different process stations as well as at different rates (e.g., asynchronously, etc.). As with the portable conveyor belt assembly 350, with the addition of appropriate mechanisms, the vehicles may be configured to move in all three dimensions (e.g., horizontal, lateral, vertical) between process stations.

Figure 4:
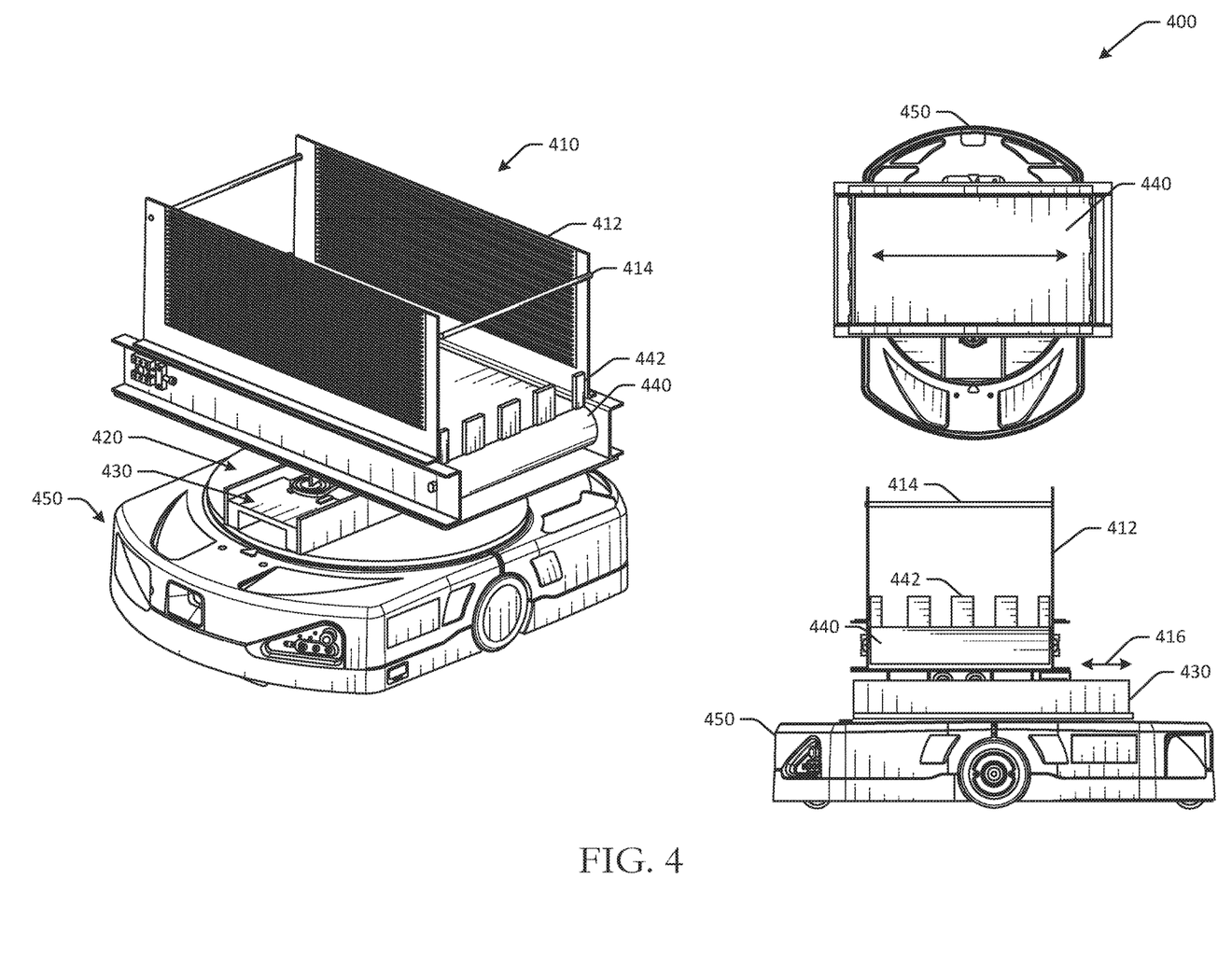
FIG. 4 is a schematic illustration of an example vehicle and portable conveyor assembly for multimodal asynchronous transportation in various views in accordance with one or more example embodiments of the disclosure.

FIG. 4 depicts a schematic illustration of an example vehicle and portable conveyor assembly 400 for multimodal asynchronous transportation in various views in accordance with one or more example embodiments of the disclosure. Other embodiments may include additional or fewer components. The illustration of FIG. 4 is not to scale, and may not be illustrated to scale with respect to other figures. The system illustrated in FIG. 4 may include the same vehicle and portable conveyor assembly discussed with respect to FIGS. 1-3.

In FIG. 4, a portable conveyor assembly 410 may be coupled to a vehicle 450, and is illustrated in perspective, top, and side views. The portable conveyor assembly 410 may include one or more sidewalls 412 that may prevent items from falling off of, or otherwise inadvertently leaving, the portable conveyor assembly 410. The portable conveyor assembly 410 may include one or more support bars 414 that may prevent objects from inadvertently leaving open-ended sides of the portable conveyor assembly 410. The portable conveyor assembly 410 may include a conveyor belt 440, and may optionally include a drive motor, a power source, and/or a magnet. The conveyor belt 440 may move in one or more of a forward or reverse direction, as illustrated by an arrow in the top view of FIG. 4.

The conveyor belt 440 may include one or more raised protrusions or flaps that may form a barrier on one or more open-ended sides (e.g., a side without a sidewall 412, etc.) of the portable conveyor assembly 410. For example, the conveyor belt 440 may include a first set of raised flaps 442 at a first side and a second set of raised flaps at a second open-ended side. The raised flaps may be integrated into the conveyor belt 440, or may be coupled to the conveyor belt 440. As the conveyor belt 440 moves, the raised flaps may fold underneath an upper surface of the portable conveyor assembly 410 (e.g., between the lower portion of the conveyor belt 440 and a lower surface of the portable conveyor assembly 410, etc.). For example, the raised flaps 442 may fold underneath the upper surface of the portable conveyor assembly 410 when an item is loaded onto or unloaded off of the conveyor belt 440. The raised flaps 442 may therefore be formed of a flexible and/or resilient material, such as rubber. The raised flaps 442 may form barrier(s) to prevent items rolling off of the conveyor belt 440.

The portable conveyor assembly 410 may include one or more rails and one or more coupling mechanisms 420 at a lower surface of the portable conveyor assembly 410 that may be used to guide movement of the portable conveyor assembly 410 and to couple the portable conveyor assembly 410 to the vehicle 450 or to another system component, respectively.

The portable conveyor assembly 410 may be configured to couple to an item sortation system to receive sorted items, and to couple to the vehicle 450 for transportation of the portable conveyor assembly 410 from a first system to a second system of a fulfillment center.

The vehicle 450 may be configured to transport the portable conveyor assembly 410. To couple to the vehicle 450, the portable conveyor assembly 410 may include the coupling mechanism 420, as discussed in more detail with respect to FIG. 6. In an example, the vehicle 450 may include a set of one or more rails 430 that can be used to guide the portable conveyor assembly 410 onto and/or off of the vehicle 450 along respective directions 416. In other embodiments, the portable conveyor assembly 410 may be on-boarded or removed from the vehicle 450 from either direction. The portable conveyor assembly 410 may be configured to rotate 360 degrees about the vehicle 450. For example, the rails 430 may rotate in a full or partial circle, which in turn may provide the portable conveyor assembly 410 with up to 360 degrees of rotation about the vehicle 430.

Figure 5:
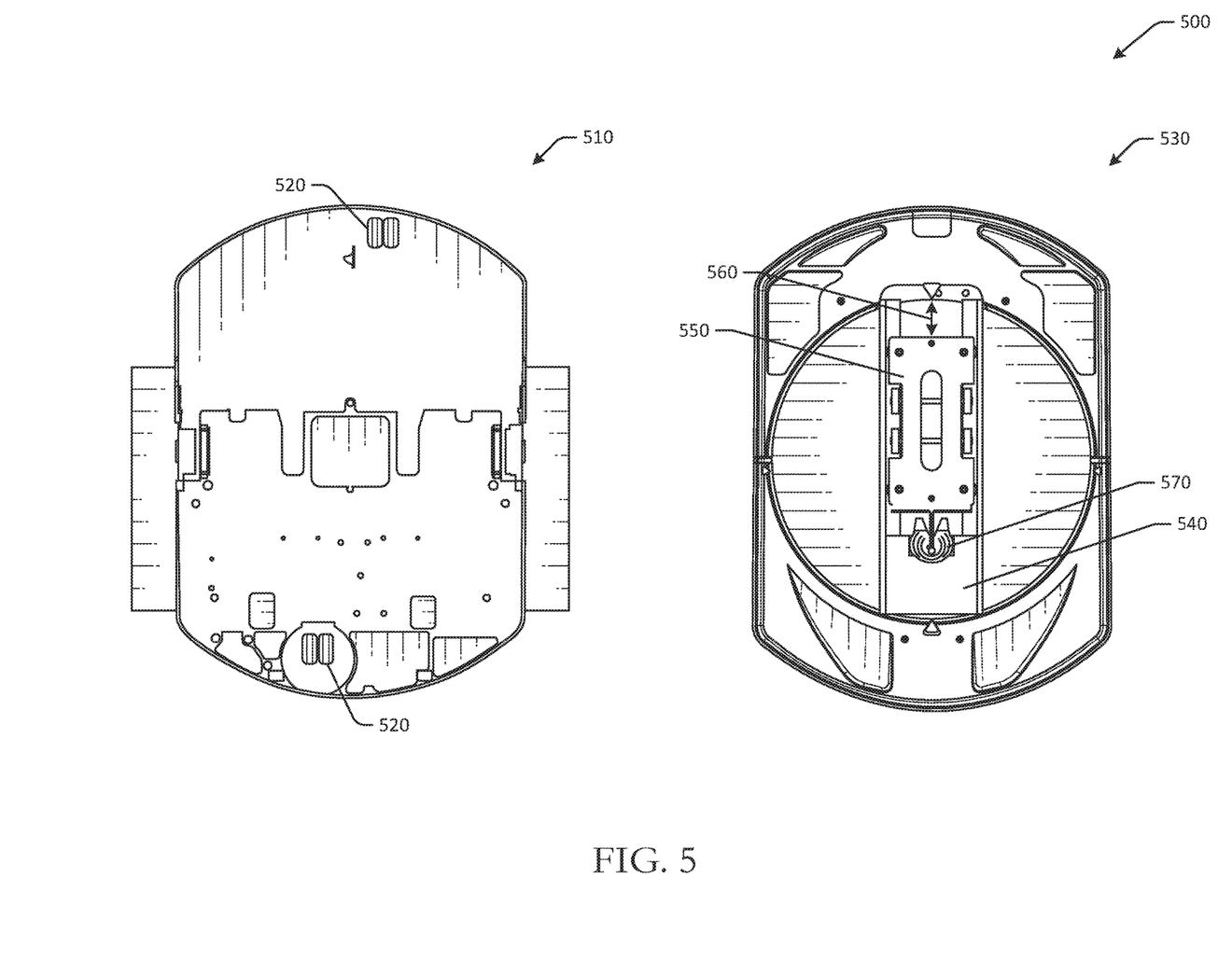
FIG. 5 is a schematic illustration of an example vehicle and portable conveyor assembly support in accordance with one or more embodiments of the disclosure.

FIG. 5 is a schematic illustration of an example vehicle and portable conveyor assembly support 500 in accordance with one or more embodiments of the disclosure. Other embodiments may include additional or fewer components. The illustration of FIG. 5 is not to scale, and may not be illustrated to scale with respect to other figures. The system illustrated in FIG. 5 may be the same multimodal asynchronous transportation system discussed with respect to FIGS. 1-4.

A vehicle 510, which may be the vehicle 450 discussed with respect to FIG. 4, is depicted in a bottom view and a top view 530. The vehicle 510 may include one or more wheels 520 that may be rotatable so as to provide a zero-turn radius for the vehicle 510.

In the top view 530, a portable conveyor assembly support 550 is depicted in addition to the vehicle 510. The portable conveyor assembly support 550 may be a part of a portable conveyor assembly, and may be used to couple the portable conveyor assembly to the vehicle 510. The vehicle 510 may include a component 540 that may include guide rails for the portable conveyor assembly support 550. The component 540 may also include a hitch 570 that may be used to engage a portion of the portable conveyor assembly support 550 to secure the portable conveyor assembly in position. In other embodiments, the hitch 570 may not be included, or may be positioned elsewhere instead of at an end of the rails as illustrated. Some embodiments may use different mechanical or electromagnetic features to secure the portable conveyor assembly is position.

Figure 6:
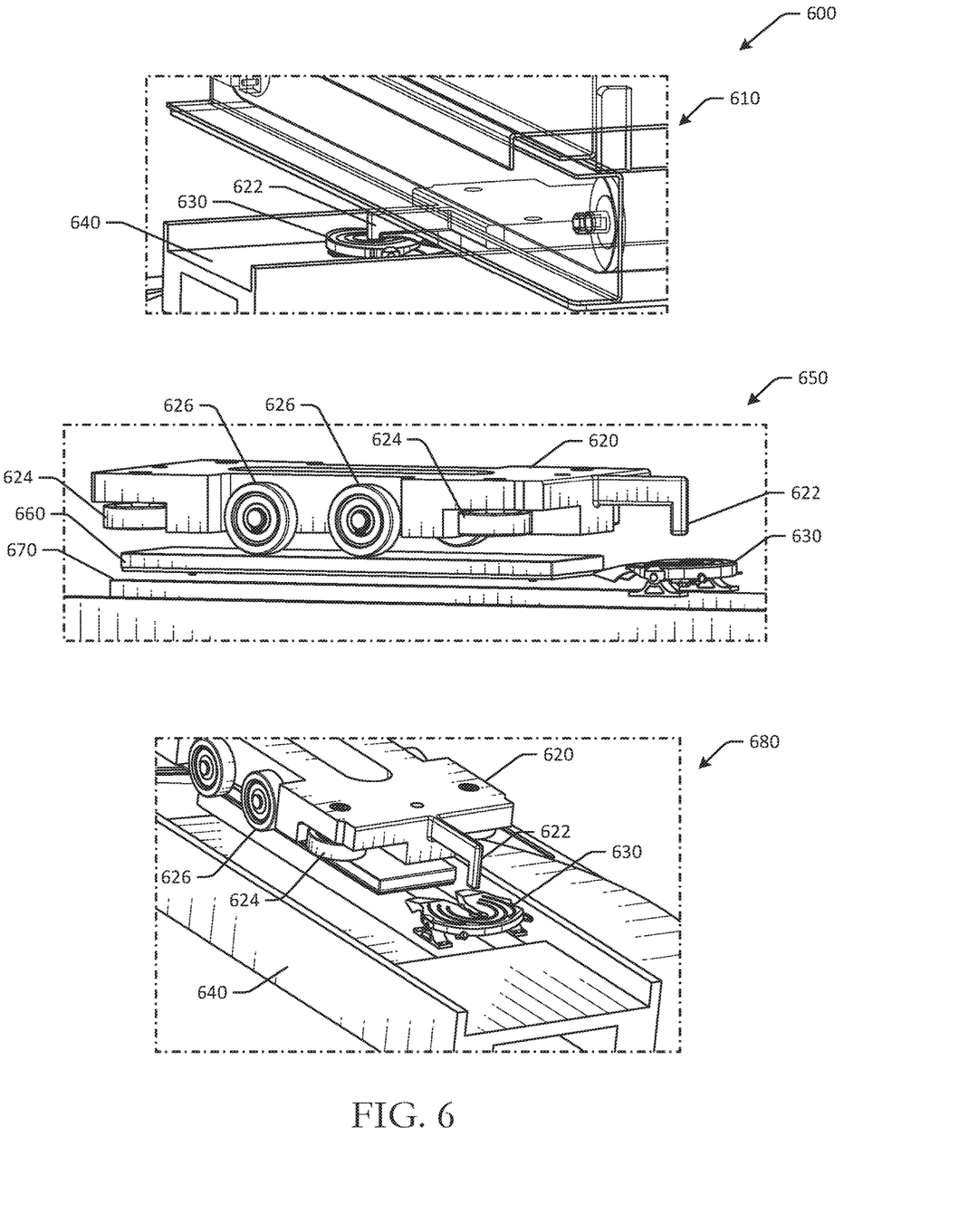
FIG. 6 is a schematic illustration of an example coupling mechanism for a portable conveyor assembly and vehicle in accordance with one or more embodiments of the disclosure.

The portable conveyor assembly support 550 may move along the rails of the component 540 in directions 560 to engage or disengage the hitch 570, as discussed in more detail with respect to FIG. 6.

The vehicle 510 may be configured to rotate the portable conveyor belt assembly up to 360 degrees about the vehicle 510. The portable conveyor belt assembly may include the portable conveyor assembly support 550, which may have a mechanical coupler, such as a hitch pin, hook, or other engagement mechanism configured to couple to the hitch 570. The coupler may be configured to engage a receiver mounted on the vehicle 510, such as the hitch 570. Other types of receivers and/or coupling systems, such as electromagnetic coupling systems, may be used. The coupler may be uncoupled from the receiver via force from a linear drive motor of the vehicle 510. In the illustrated embodiment, the positioning of the hitch 570 may indicate that the portable conveyor assembly can be on-boarded from a single direction. In other embodiments, the hitch 570 may be placed in a middle of the rails of the component 540, such that the portable conveyor assembly can be on-boarded from either side of the component 540. The portable conveyor assembly support 550 may include one or more rails configured to engage a forklift, an elevator, or the vehicle 510 for transportation of the portable conveyor assembly.

FIG. 6 is a schematic illustration of an example coupling mechanism for a portable conveyor assembly and vehicle 600 in accordance with one or more embodiments of the disclosure. Other embodiments may include additional or fewer components. The illustration of FIG. 6 is not to scale, and may not be illustrated to scale with respect to other figures. The system illustrated in FIG. 6 may be the same multimodal asynchronous transportation system discussed with respect to FIGS. 1-5.

In FIG. 6, a close-up view 610, a portable conveyor assembly support 620 of a portable conveyor assembly may include a pin or other coupler 622 that is configured to engage a hitch or other receiver 630 on a rail component 640 of a vehicle.

As depicted in an exploded side view 650 and exploded perspective view 680, the portable conveyor assembly support 620 may include one or more guide wheels that may be configured to guide the portable conveyor assembly onto and/or off of the rail component 640 of the vehicle. For example, the portable conveyor assembly support 620 may include a set of one or more vertically oriented guide wheels 626 that may be configured to facilitate movement of the portable conveyor assembly. The portable conveyor assembly support 620 may include a set of one or more horizontally oriented guide wheels 624 configured to guide the portable conveyor assembly onto and off of the vehicle. Any number and/or orientation of guide wheels may be included. In some embodiments, guide wheels may have a V-shaped cross-section, such that a rail of the rail component 640 slides along a lower portion of the V-shape. The portable conveyor assembly support 620 may be a support disposed on a lower surface of the portable conveyor assembly. The set of vertically oriented guide wheels 626 and the set of horizontally oriented guide wheels 624 may be coupled to the portable conveyor assembly support 620.

The portable conveyor assembly may include a magnet 660 disposed on a lower surface of the portable conveyor assembly. The magnet 660 may be configured to facilitate movement of the portable conveyor assembly support in conjunction with a linear drive motor 670 of the vehicle. For example, the magnet 660 may be engaged by the linear drive motor 670 to prevent motion of the portable conveyor assembly on the vehicle during transport using electromagnetic force.

The coupler 622 may be configured to engage the receiver 630 mounted on the vehicle. The coupler 622 may be uncoupled from the receiver 630 via electromagnetic force from a linear drive motor 670 of the vehicle. For example, electromagnetic force may be used to decouple the portable conveyor assembly support 620 from the receiver 630, rather than mechanical action, in an example embodiment. In other embodiments, mechanical action may be used to decouple the portable conveyor assembly support 620 from the receiver 630.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
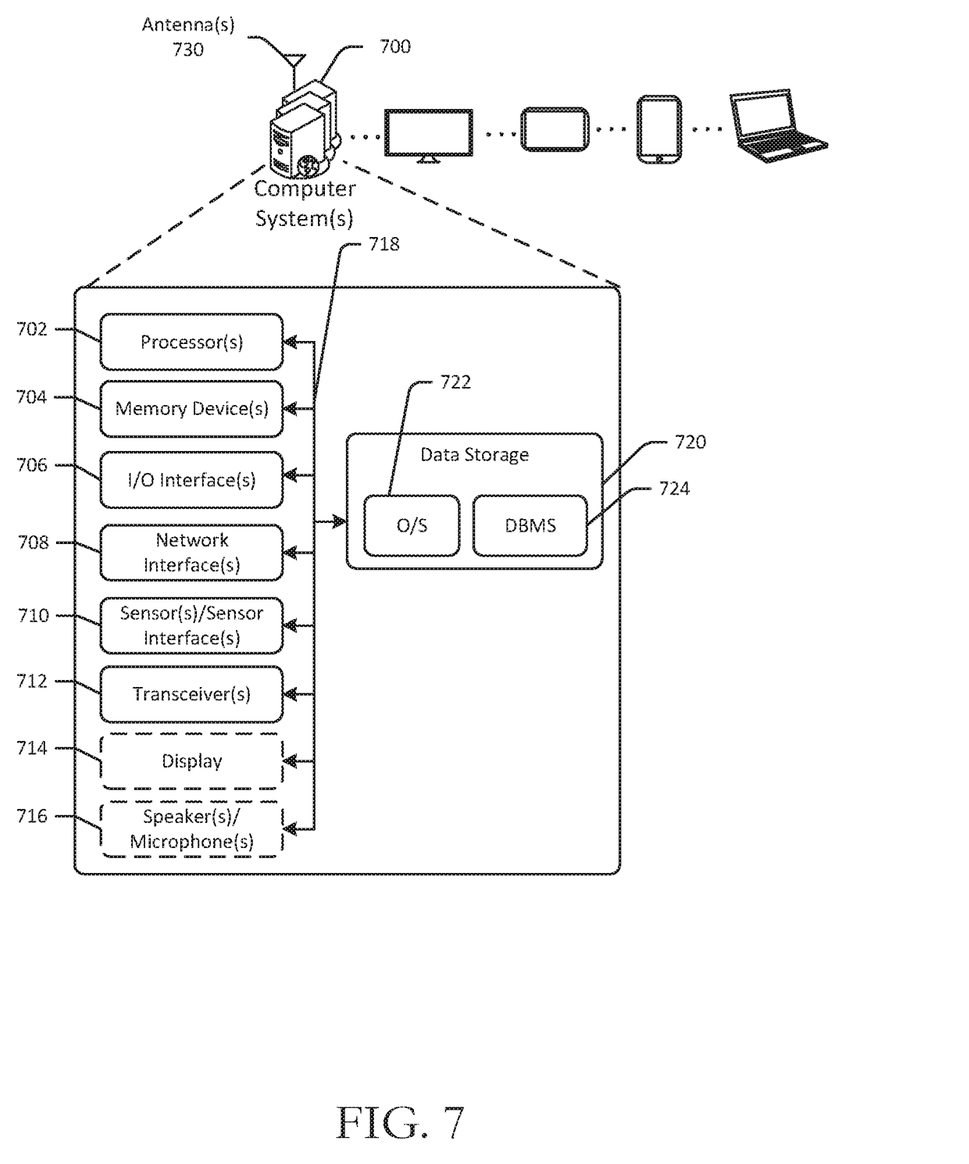
FIG. 7 schematically illustrates an example architecture of a computer system associated with a multimodal asynchronous transportation system in accordance with one or more embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for the device(s) of FIGS. 1-6. For example, the computer system(s) 700 may be a controller and may control one or more aspects of the multimodal asynchronous transportation system described in FIGS. 1-6.

The computer system(s) 700 may be configured to communicate with one or more servers, user devices, or the like. The computer system(s) 700 may be configured to identify items, retrieve items, move items, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s)

may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-6 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
a picking station at which items for online orders are removed from inventory;
a sorting station at which items are sorted into containers associated with respective online order identifiers;
a packing station at which items for online orders are packed into boxes for shipment;
a vehicle configured to move between the picking station, the sorting station, and the packing station, the vehicle comprising a linear drive motor; and
a portable conveyor belt assembly configured to be loaded onto and unloaded off of the vehicle using the linear drive motor, wherein the portable conveyor belt assembly comprises:
a conveyor belt comprising a first set of raised flaps and a second set of raised flaps, wherein the first set of raised flaps forms a first barrier and the second set of raised flaps forms a second barrier to prevent items rolling off of the conveyor belt;
a drive motor configured to move the conveyor belt in a forward direction and a reverse direction; and
a magnet disposed on a lower surface of the portable conveyor belt assembly, wherein the magnet prevents the portable conveyor belt assembly from moving while the vehicle is in motion and the linear drive motor is engaged.

2. The system of claim 1, wherein the portable conveyor belt assembly is configured to be inducted into the picking station, the sorting station, and the packing station; and
wherein the portable conveyor belt assembly is configured to be transported from the picking station to the sorting station or the packing station via the vehicle.

3. The system of claim 1, wherein the vehicle is configured to rotate the portable conveyor belt assembly 360 degrees about the vehicle;
wherein the portable conveyor belt assembly further comprises a coupler configured to engage a receiver mounted on the vehicle; and
wherein the coupler is uncoupled from the receiver via electromagnetic force from the linear drive motor.

4. The system of claim 1, further comprising:
a computer system in communication with the vehicle, the computer system configured to:
determine that the portable conveyor belt assembly comprises an item for a single-item online order; and
cause the vehicle to retrieve the portable conveyor belt assembly from the picking station and to deliver the portable conveyor belt assembly to the packing station while bypassing the sorting station.

5. A system comprising:
a portable conveyor assembly configured to receive one or more items, the portable conveyor assembly comprising:
a conveyor belt having a first set of raised flaps that form a first barrier on the conveyor belt, the first set of raised flaps configured to fold underneath an upper surface of the portable conveyor assembly;
a drive motor; and
a magnet;
wherein the portable conveyor assembly is configured to couple to an item sortation system to receive sorted items, and to couple to a vehicle for transportation of the portable conveyor assembly from the item sortation system to a different system of a fulfillment center.

6. The system of claim 5, wherein the first set of raised flaps prevent items rolling off of the conveyor belt;
wherein the first set of raised flaps folds underneath the upper surface of the portable conveyor assembly when an item is loaded onto or unloaded off of the conveyor belt.

7. The system of claim 5, wherein the magnet is configured to prevent motion of the portable conveyor assembly on the vehicle during transport via electromagnetic force.

8. The system of claim 5, wherein the portable conveyor assembly further comprises:
a coupler configured to engage a receiver mounted on the vehicle;
wherein the coupler is uncoupled from the receiver via electromagnetic force from a linear drive motor of the vehicle.

9. The system of claim 5, wherein the portable conveyor assembly further comprises:
a set of vertically oriented guide wheels configured to facilitate movement of the portable conveyor assembly; and
a set of horizontally oriented guide wheels configured to guide the portable conveyor assembly onto and off of the vehicle.

10. The system of claim 9, wherein the portable conveyor assembly further comprises:
a support disposed on a lower surface of the portable conveyor assembly;
wherein the set of vertically oriented guide wheels and the set of horizontally oriented guide wheels are coupled to the support.

11. The system of claim 5, further comprising:
a computer system configured to:
determine that the portable conveyor assembly comprises an item for a single-item online order; and
cause the vehicle to retrieve the portable conveyor assembly from an item picking system and to deliver the portable conveyor assembly to an item packing system while bypassing the item sortation system.

12. The system of claim 5, wherein the portable conveyor assembly is configured to rotate 360 degrees about the vehicle.

13. The system of claim 5, wherein the different system is an item packing system or an item picking system.

14. The system of claim 5, wherein the portable conveyor assembly further comprises:
one or more rails configured to engage a forklift, an elevator, or the vehicle for transportation of the portable conveyor assembly.

15. A system comprising:
a portable conveyor assembly configured to receive one or more items, the portable conveyor assembly comprising:
a conveyor belt;
a drive motor;
a magnet;
a set of vertically oriented guide wheels;
a set of horizontally oriented guide wheels; and
a support disposed on a lower surface of the portable conveyor assembly, wherein the set of vertically oriented guide wheels and the set of horizontally oriented guide wheels are coupled to the support; and
a vehicle configured to transport the portable conveyor assembly,
wherein the portable conveyor assembly is configured to couple to an item sortation system to receive sorted items, and to couple to the vehicle for transportation of the portable conveyor assembly from a first system to a second system of a fulfillment center.

16. The system of claim 15, wherein the first system is an item picking system and the second system is an item packing system, and wherein the vehicle is configured to determine that a single item is disposed on the portable conveyor assembly, and to determine that an item sortation system is to be bypassed.

17. The system of claim 15, wherein the vehicle is configured to pause during transport to form a buffer between the first system and the second system.

18. The system of claim 15, wherein the portable conveyor assembly is configured to be coupled to the first system and the second system of the fulfillment center using one or more mechanical couplers.

19. The system of claim 15, wherein the set of vertically oriented guide wheels is configured to facilitate movement of the portable conveyor assembly, and the set of horizontally oriented guide wheels is configured to guide the portable conveyor assembly onto and off of the vehicle.

20. The system of claim 15, wherein the vehicle is an autonomous robot is configured to dynamically determine a path through the fulfillment center.

* * * * *